(12) United States Patent
Dickinson et al.

(10) Patent No.: US 11,815,206 B2
(45) Date of Patent: Nov. 14, 2023

(54) STRUCTURAL FASTENER (71) Applicant: Mag Daddy LLC, Cary, IL (US)

(72) Inventors: Daniel James Dickinson, Lincolnshire, IL (US); Michael Walter Smith, Palatine, IL (US)

(73) Assignee: MAG DADDY LLC, Wauconda, IL (US)

( * ) Notice: Subject to any disclaimer, the term of this patent is extended or adjusted under 35 U.S.C. 154(b) by 0 days.

(21) Appl. No.: 17/182,025

(22) Filed: Feb. 22, 2021

(65) Prior Publication Data

US 2021/0207742 A1     Jul. 8, 2021

Related U.S. Application Data

(63) Continuation-in-part of application No. 16/597,060, filed on Oct. 9, 2019, which is a continuation-in-part of application No. 15/998,605, filed on Aug. 20, 2018, now Pat. No. 11,261,897, which is a continuation-in-part of application No. 14/147,522, filed on Jan. 4, 2014, now Pat. No. 11,603,050, which is a continuation-in-part of application No. 13/476,957, filed on May 21, 2012, now abandoned, which is a continuation-in-part of application No. 11/564,840, filed on Nov. 29, 2006, now abandoned, which is a continuation-in-part of application No. 10/942,634, filed on Sep. 16, 2004, now Pat. No. 7,188,392.

(60) Provisional application No. 62/980,422, filed on Feb. 23, 2020.

(51) Int. Cl.
*F16L 3/04* (2006.01)
*F16L 3/06* (2006.01)
*F16B 7/04* (2006.01)

(52) U.S. Cl.
CPC .............. *F16L 3/04* (2013.01); *F16B 7/0473* (2013.01); *F16L 3/06* (2013.01)

(58) Field of Classification Search
CPC ... F16L 3/227; F16L 3/24; F16L 3/243; F16B 37/043; F16B 7/0473; F16B 37/045; F24S 2025/804
See application file for complete search history.

(56) References Cited

U.S. PATENT DOCUMENTS 2,918,240 A * 12/1959 Wiegand ................. F16L 3/227
248/71
3,346,863 A * 10/1967 Siebold .................... H01Q 7/00
343/702
3,532,311 A * 10/1970 Havener ................. F16L 3/227
248/62

(Continued)

*Primary Examiner* — Bradley Duckworth (57) ABSTRACT

A U-shaped clamp to attach or snap a conduit or pipe to a slotted structural member. The U-shaped clamp includes a bottom portion, a first side having a first wing connected to the bottom portion; a second side having a second wing connected to the bottom portion thereby forming a U-shaped structure with the first and second sides. The at least one wing snaps into a strut ledge or a rolled edge of the structural member when in an engaged position. The structural member may be a strut or a receiver. The wings engage and snap into curled ends or lips on sides of the strut and thus may adapt the pipe clamp to the strut. Alternatively, the U-shaped clamp may snap into suitably sized strut ledges or a rolled edges on the structural member.

20 Claims, 9 Drawing Sheets

(56) References Cited

U.S. PATENT DOCUMENTS

| | | | | |
|---|---|---|---|---|
| 5,149,026 | A * | 9/1992 | Allen | F16L 3/227 |
| | | | | 248/68.1 |
| 6,257,530 | B1 * | 7/2001 | Tsai | F16L 3/127 |
| | | | | 248/73 |
| 6,354,543 | B1 * | 3/2002 | Paske | H01P 1/00 |
| | | | | 248/68.1 |
| 7,090,174 | B2 * | 8/2006 | Korczak | F16B 37/045 |
| | | | | 248/61 |
| 8,439,316 | B2 * | 5/2013 | Feige | F16L 3/10 |
| | | | | 248/71 |
| 8,590,223 | B2 * | 11/2013 | Kilgore | H02S 20/24 |
| | | | | 52/173.3 |
| 8,800,120 | B2 * | 8/2014 | Benedetti | F16B 5/0642 |
| | | | | 24/458 |
| 8,844,888 | B1 * | 9/2014 | Gretz | F16L 3/2431 |
| | | | | 248/231.81 |
| 9,331,629 | B2 * | 5/2016 | Cheung | H02S 20/23 |
| 9,879,803 | B2 * | 1/2018 | Leng | H02G 3/32 |
| 2011/0084179 | A1 * | 4/2011 | Wiedner | F16L 3/12 |
| | | | | 248/67.7 |
| 2018/0245716 | A1 * | 8/2018 | Nijdam | H02G 3/0456 |
| 2018/0335072 | A1 * | 11/2018 | Wilson | F16B 37/043 |
| 2018/0347614 | A1 * | 12/2018 | Reznar | F16B 37/046 |
| 2020/0347962 | A1 * | 11/2020 | Smith | F16L 3/227 |

* cited by examiner

STRUCTURAL FASTENER

RELATED APPLICATIONS

This application claims benefit of provisional patent application 62/980,422 filed on Feb. 23, 2020. This application is a continuation in part application of U.S. patent application Ser. No. 16/597,060 entitled "Structural Fastener" filed on Oct. 9, 2019, which is a continuation in part application of U.S. patent application Ser. No. 15/998,605 entitled "Structural Fastener" filed on Aug. 20, 2018, which is a continuation in part application of U.S. patent application Ser. No. 14/147,522 entitled "Spring fastener" filed on Jan. 4, 2014, which is a continuation in part application of U.S. patent application Ser. No. 13/476,957 entitled "Spring fastener with highly improved lever/angle pulling force" filed on May 21, 2012, which is a continuation in part of U.S. patent application Ser. No. 11/564,840 entitled "Spring fastener with highly improved lever/angle pulling force" filed on Nov. 29, 2006, which is a continuation in part of U.S. Pat. No. 7,188,392 entitled "Spring fastener with highly improved lever/angle pulling force", filed on Sep. 16, 2004, which claims priority from provisional application 60/520,807 filed on Nov. 17, 2003 and owned by the instant assignee.

FIELD OF THE INVENTION

The invention relates generally to devices for fastening objects, and more particularly to a fastener and strut hangers to secure construction components or to attach onto an engagement structure, such as a chassis, a strut, a hollow substrate, a wall, a plate or any suitable surface.

BACKGROUND OF THE INVENTION

A number of devices and fasteners are currently available to secure cables or for fastening pipes, conduit and cables to a building structure. Similarly, threaded rods, struts, panels, body panels, building structure, and electrical conduit are fastened to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. The chassis of the building may include any substrate, plate, roof or ceiling support, structural framework, chassis component or subcomponent, support component, wall or any suitable object or combination.

Attaching wires or cables to a building structure, electrical box or body panel typically requires conventional securing threaded rods, bolts, wires, cable clamps, electrical boxes, screw in cable clamps, straps, tape or clips already fastened to a wire assembly. These conventional devices require two hands to manipulate and install and require time to screw a bolt or nut. If the installed device is not in the desired position or level, then the installer must loosen the screw or bolt and then re-align the device and retighten, thus extending the installation time even further. At least some of the conventional fasteners require extended height or blind insertion for installation of the fasteners because the installer is not able to view the fastener or the mounting point on the body panel. These conventional fasteners require fastening with a screwdriver or wrench and thus are cumbersome and difficult to install, especially in inaccessible areas. Nor can they be installed without a screwdriver or wrench for example on an electrical box, conduit or in automobile environments that can be somewhat harsh. Further, replacement of an installed frozen, corroded, broken nut, rod or strut requires removal and can again be difficult.

DETAILED DESCRIPTION OF THE PREFERRED EMBODIMENTS

A U-shaped clamp to attach or snap a conduit or pipe to a slotted structural member sometimes referred to a "strut". The U-shaped clamp includes a bottom portion, a first side having a first wing connected to the bottom portion; a second side having a second wing connected to the bottom portion thereby forming a U-shaped structure with the first and second sides. The at least one wing snaps into a strut ledge or a rolled edge of the structural member when in an engaged position. The structural member may be a strut or a receiver. The wings engage and snap into curled ends or lips on sides of the strut and thus may adapt the pipe clamp to the strut. Alternatively, the U-shaped clamp may snap into suitably sized strut ledges or rolled edges on the structural member.

According to one embodiment, wings on each of the ends of the pipe clamp engage corresponding strut ledges or a rolled edge on the structural member to stabilize and retain the pipe clamp. The wings include a back angle having an engagement region on the strut ledges. The engagement regions may engage an edge or portion of a strut ledge on each channel rib of the strut.

The pipe clamp are comprised of at least one of: spring steel, zinc die cast, machine steel, cast plastic or powdered metal, cindered (pressing powder together), plastic, vinyl, rubber, plastisol, plastic, acetal, polyacetal, polyoxymethylene, nylon, fiberglass and carbon fiber.

During installation, the pipe clamp may be easily snapped into the strut and the pipe clamp quickly attaches the pipe to the strut. This reduces the amount of time to attach pipes, conduit electrical wires or any suitable construction materials to structural members and thus to a building structure.

The pipe clamp permits relatively easy insertion of the, pipe, claim and strut assembly into a building chassis, pillar, structure, door, roof or suitable panel while providing a relatively high level of strength and support. Assembly of the pipe clamp onto the strut is very easy and requires no or a relatively low level of installation effort and as a result provides many ergonomic advantages. The pipe clamp eliminates or reduces the need for threading a clamp or nut on a long threaded rod, and thus eliminates the effort and time to attach a pipe to the strut by spinning a nut one from an end of the threaded rod assembly. Among other advantages, the installer can snap the pipe clamp with one hand whereas the prior art conventional clamp and nuts require two hands to hold the clamp or nut and the structural construction member.

The relatively easy attachment is particularly advantageous for operators who frequently or repetitively install a large number of pipes, conduit electrical wires or any suitable construction materials onto the building chassis. The relatively easy installation required for inserting the receiver and pipe clamp into the strut and into building or chassis may result in fewer injuries to the assembly workers, including injuries related to repetitive stress syndrome.

The pipe clamp has several features described in parent U.S. patent application Ser. No. 16/597,060 entitled "Structural Fastener" filed on Oct. 9, 2019 herby incorporated by reference. The pipe clamp may thus be inserted into the receiver described in this parent application or into the strut as described herein. Further by selecting a single adaptive pipe clamp or reducing the number of different pipe clamps for different strut lengths and thicknesses, confusion during assembly is eliminated or reduced since the same type or a reduced number of fasteners may be used for all or most struts. Thus, an electrician, installer, or assembly worker need not worry about selecting the wrong pipe clamp fastener.

The relatively high level of strength characteristic of the pipe clamp securely attaches to the strut and to the building or chassis. Further, the pipe clamp quickly and easily adjusts to the structural member and minimizes long tedious threading of nuts and clamps, reduces flexing of the fastener and structural members, as frequently occurs when pushing by operators, or when exposed to vibration and thermal expansion. For example, since conventional top and bottom nuts between the strut are required to clamp to conventional struts, repositioning of nuts, or changes in length of the strut or rod requires untightening and tightening of the nuts. In contrast, the pipe clamp may be easily moved by sliding the clamp with or without the pipe, along the strut ledge or removed from and then easily inserted into the desired position on the structural member. The receiver and pipe clamp may also fasten to plastic and/or metal engagement structures. The pipe clamp nut may be made of anti-corrosive material such as galvanized spring steel, stainless steel, plastic or treated metal to provide long reliable service life.

Yet another advantage is that and pipe clamp is relatively easy to manufacture using relatively inexpensive machines, manufacturing processes and materials. The use of the receiver and pipe clamp decreases installation effort and time, reduces assembly and production costs, increases worker productivity and efficiency, improves reliability and quality and decreases overall assembly, warranty and maintenance costs. Thus, the receiver and pipe clamp improves reliability both in the short term and in the long term, while further improving safety and quality.

FIGS. 1-6 are exploded views of a strut receiver assembly 100, 200, 400 providing springing attachment to a slotted structural member 10 such as a structural member commonly known as a "strut." Strut receiver assembly 100 includes a pipe clamp or cage 32 operable to detachably couple a pipe 40. According to one embodiment, strut receiver assembly 100 includes an optional strut receiver (shown as 620 in parent application) Ser. No. 16/597,060 to couple the pipe clamp or cage 32 to the strut 10.

Figure 1:
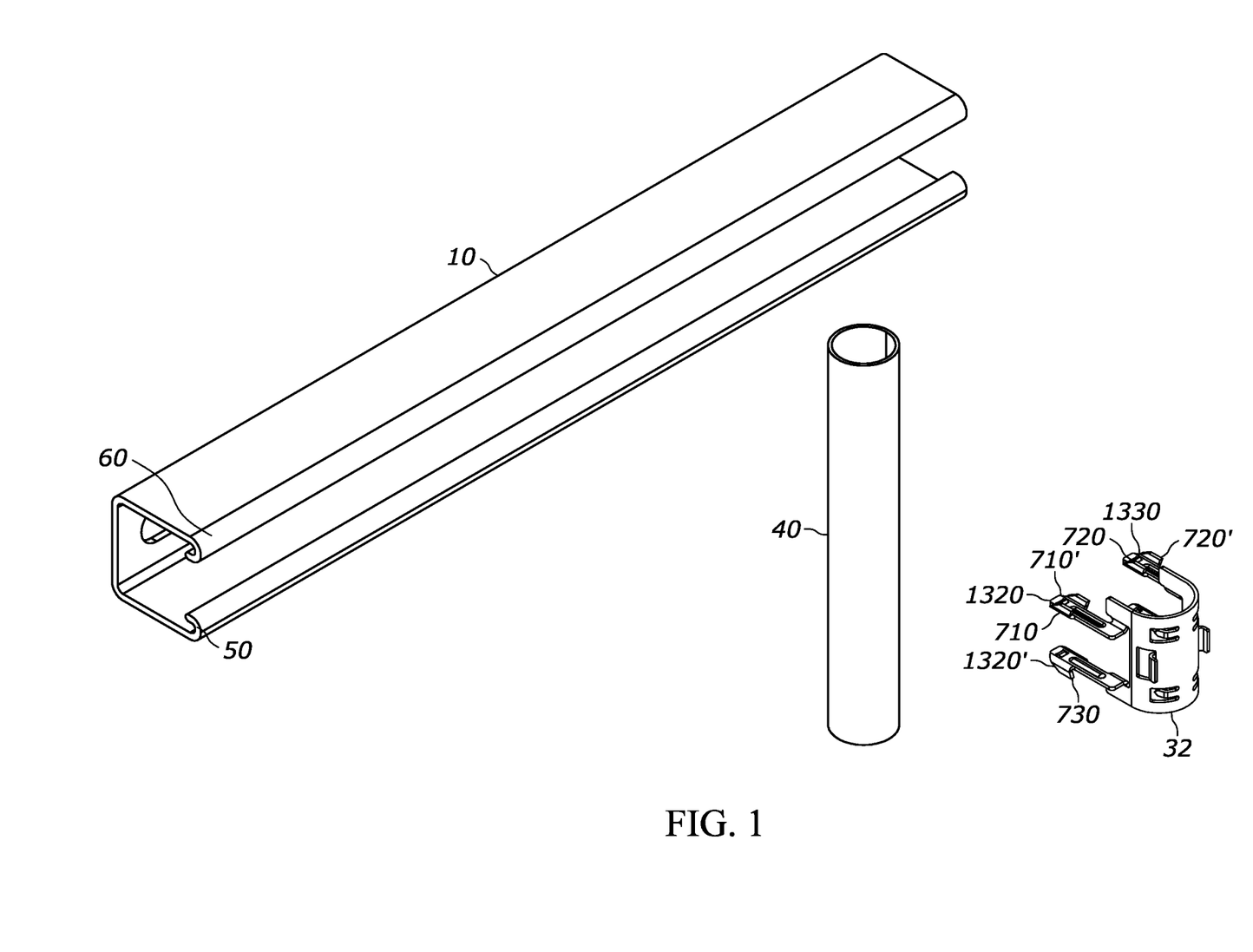
FIG. 1 is an exploded view of a structural member assembly with at least one pipe clamp and a strut member operable to attach to a conduit or pipe according to one embodiment.
Figure 5:
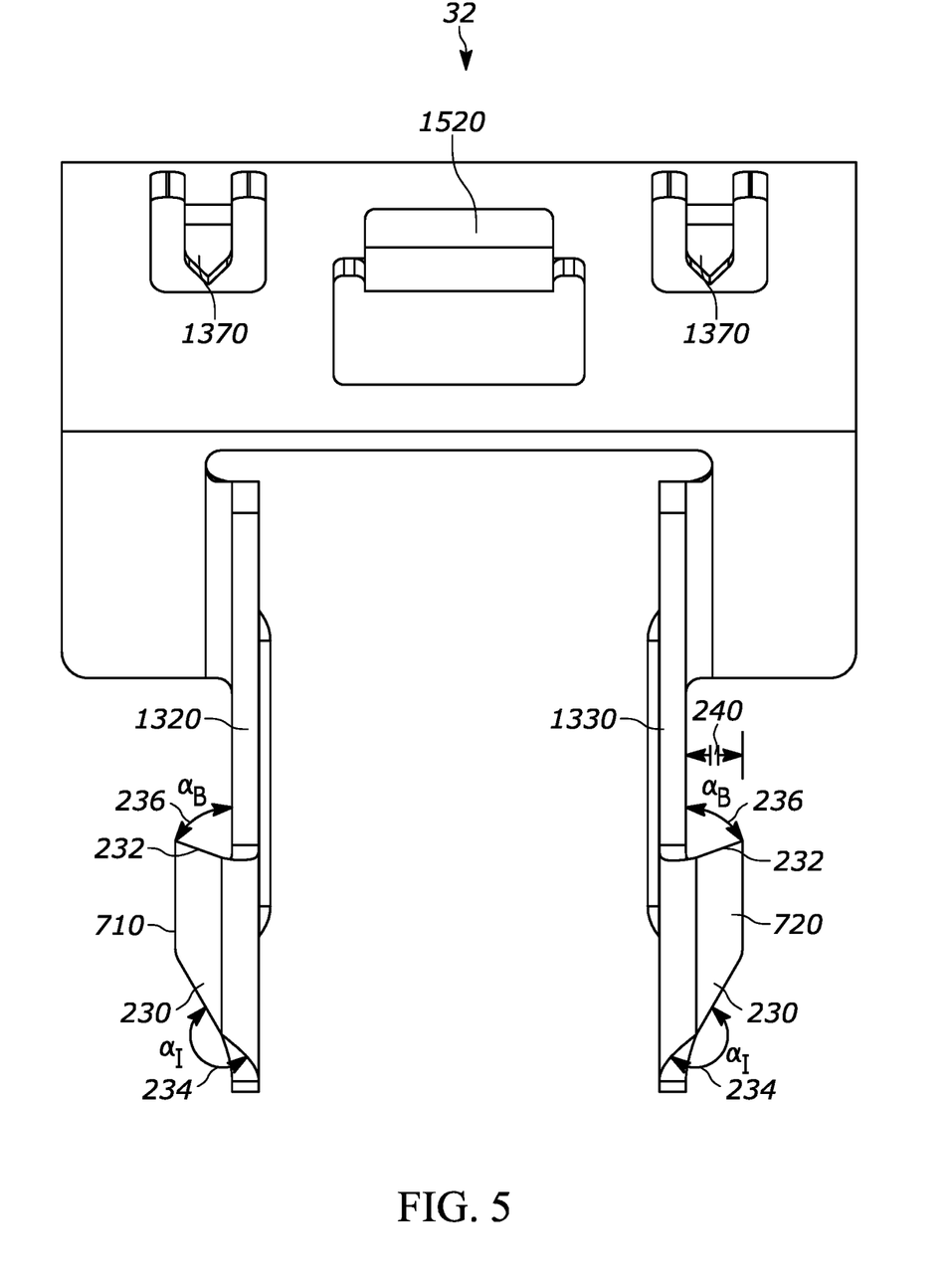
FIG. 5 is a side view of a pipe clamp in FIG. 4 rotated 90 degrees according to an embodiment.

FIG. 1 illustrates a pipe clamp 32 has at least 2 wings 1320, 1330, (optional 1320', 1330'), each wing 1320, 1330, having a hook 710, 720, 730, 740 (including 710', 720', 730', 740') on taper 230 as shown in FIG. 5 at the end of the hook 710, 720, 730, 740 with an initial angle αI 234. Although four wings 1320, 1330 are shown, the pipe clamp 32 may have 2, 3, 4, 5, 6, 8, 12, 16 or any suitable number of wings and corresponding hook(s) such as 710, 720, 730, 740. According to yet another embodiment, the pipe clamp 32 may have wings 1320, 1330 with one hook per wing so opposing hooks 710, 720, 730, 740 one each corresponding wing engage the open end of the strut 10.

Figure 6:
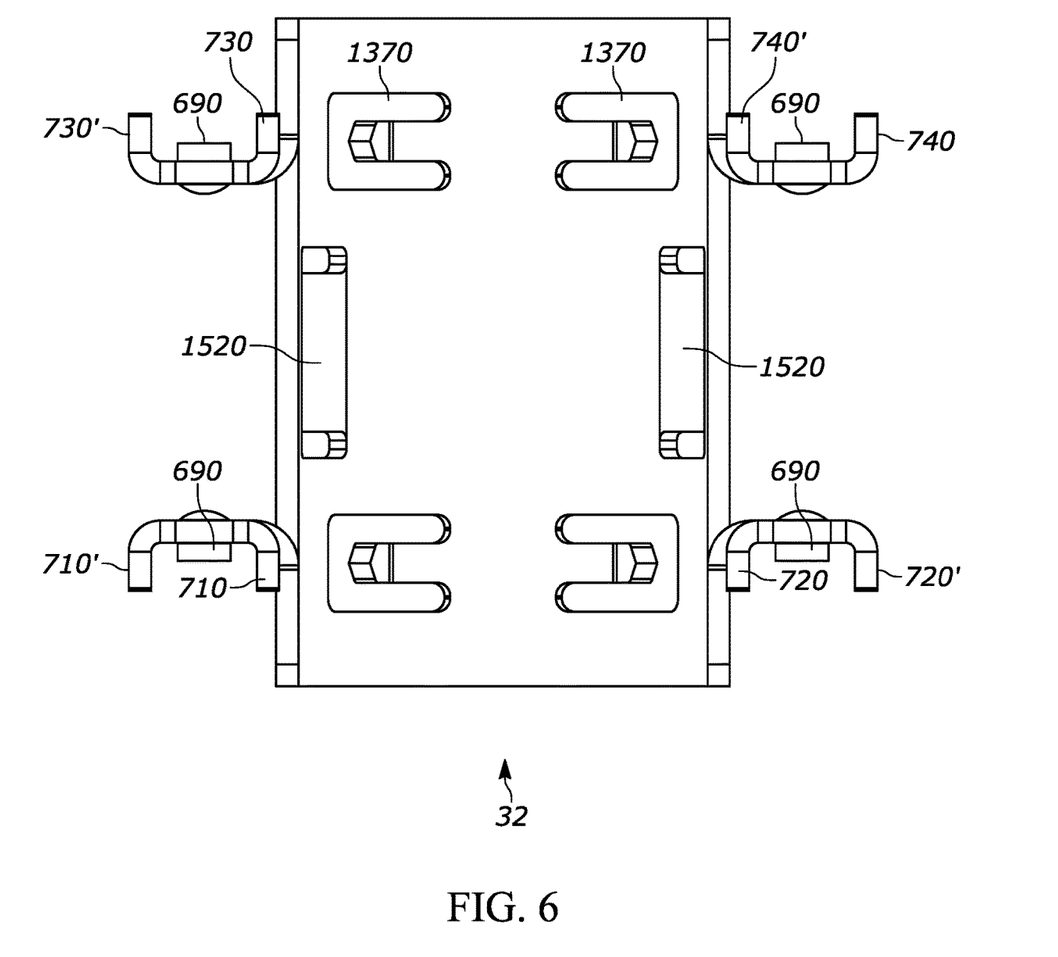
FIG. 6 is a bottom view of a pipe clamp according to an embodiment.
Figure 7:
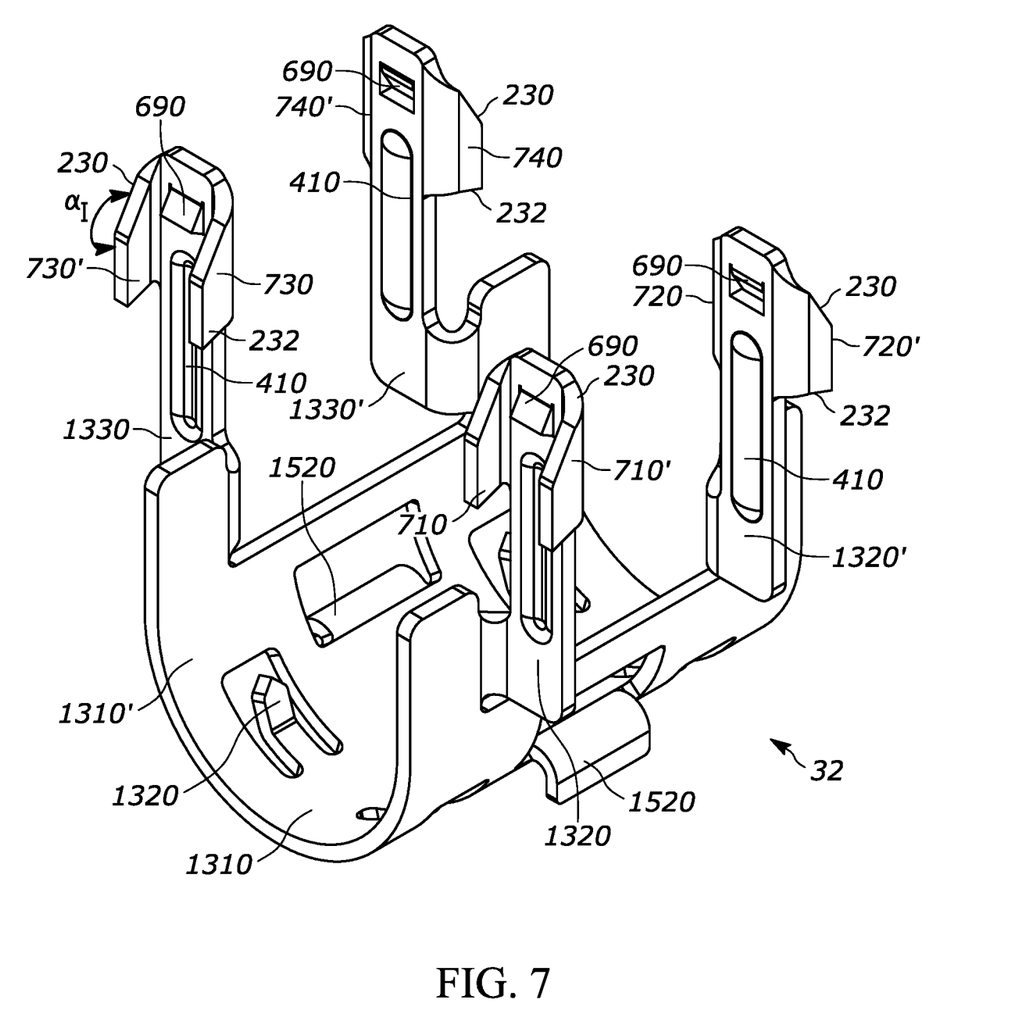
FIG. 7 is a perspective view of a pipe clamp according to an embodiment.
Figure 8:
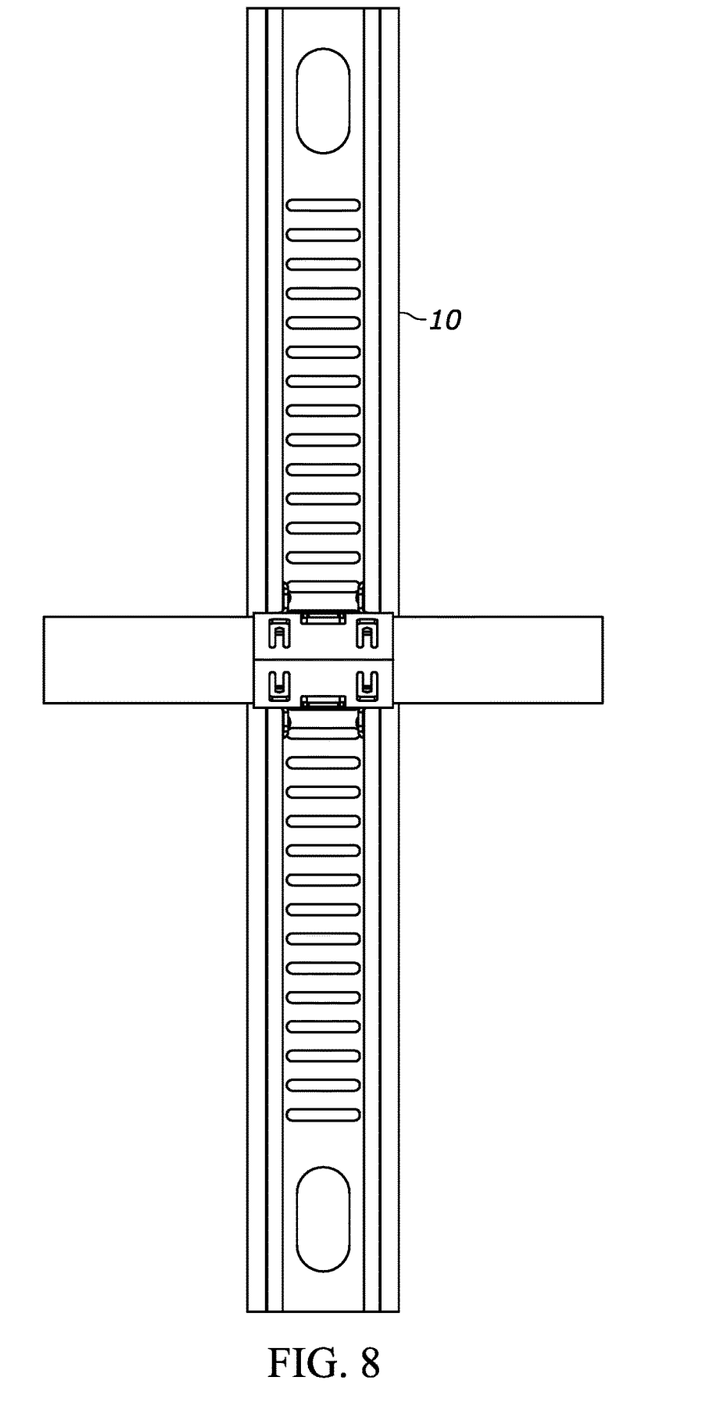
FIG. 8 is a top view of a structural member assembly according to another embodiment.
Figure 9:
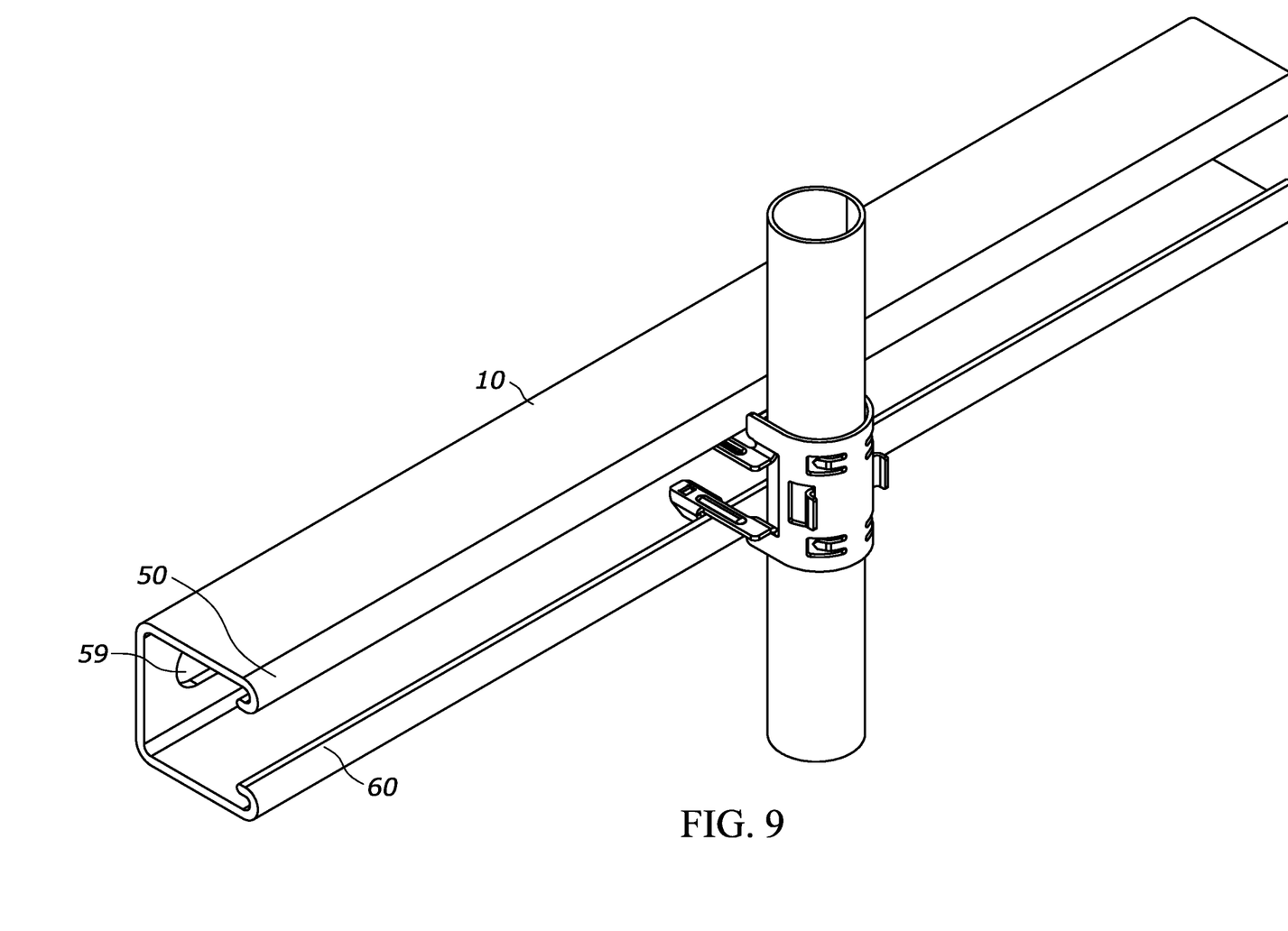
FIG. 9 is a perspective view of a structural member assembly according to another embodiment.

As shown in FIGS. 5, 6 and 7 and according to one embodiment, each wing 1320, 1330 has two tapers 230 having an initial angle αI 234 toward the end or tip of each wing 1320, 1330. For example, the tapers 230 may be stamped or cut from each wing 1320, 1330 and bent upward to form the tapers 230. Although two tapers 230 are shown on each hook 710, 720, 730, 740, 710', 720', 730', 740' each wing may have 1, 2, 3, 4 or more tapers 230 (for example stamped) depending on the level of extraction force and the desired stability required for the particular application.

Figure 2:
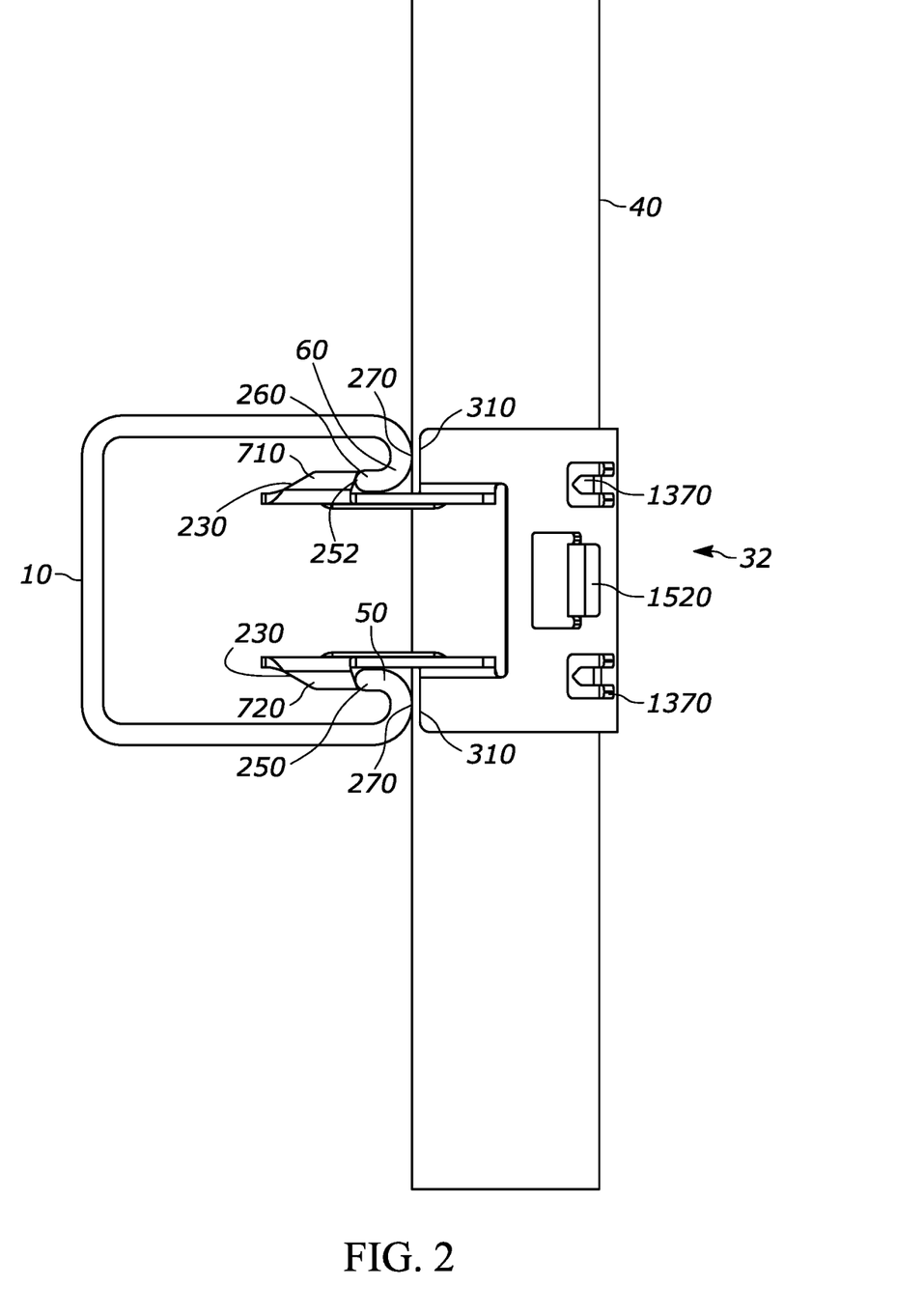
FIG. 2 is a view of a structural member assembly with at least one pipe clamp and a strut member in an engaged position according to another embodiment.
Figure 3:
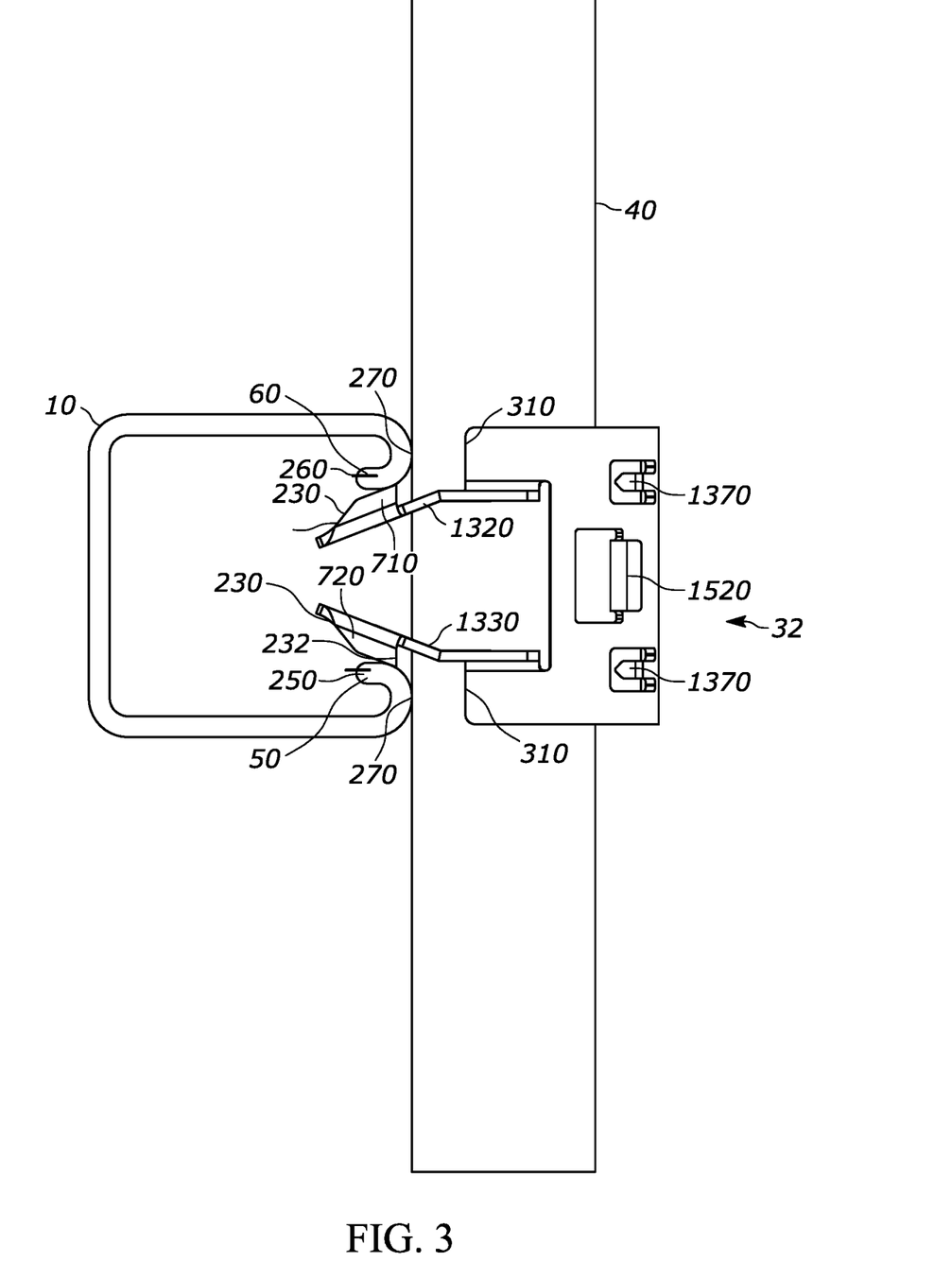
FIG. 3 is a side view of a structural member assembly with at least one pipe clamp and a strut member in a disengaged position according to one embodiment.

As shown in FIGS. 2 and 3 and according to one embodiment, wings 1320, 1330 on each at one end of the pipe clamp 32 engage corresponding strut ledges 250, 260 or a rolled edge on lip 50, 60 on the structural member 10 to stabilize and retain the pipe clamp 32. As shown in FIG. 5, the wings 1320, 1330 include a back angle 232 having an angle αB 236 having an engagement region (not shown) on the strut ledges 250, 260. The engagement regions may engage an edge or portion of strut ledges 250, 260 on each channel lip 50, 60 of the strut 10 shown in FIG. 3. According to one embodiment the engagement region includes a depression to engage the strut ledges 250, 260 and is described in U.S. Pat. No. 7,188,392 and patent application Ser. No. 16/597,060 hereby incorporated by reference (see for example first and second side engagement regions 660, 670).

As shown in FIG. 5, back angle 232, αB 236 according to one embodiment functions as a fish hook to engage ledge of the strut lip 50, 60. The fish hook is biased so the angle αB 236 curves to form a tip at the end of the back angle 232 such that as the pipe clamp 32 is extracted or pushed away from the pipe, the pipe angle αB 236 causes the hook(s) 710, 720, 730, 740, 710', 720', 730', 740' to dig into the strut ledges 250, 260 or an rolled edges on lip 50, 60. Conventional pipe clamps typically do not snap or hook into a strut.

The hook 710, 720, 730, 740, 710', 720', 730', 740' has a taper 230 on an opposite end of to slide easily along a strut chin 270 as shown in FIGS. 2 and 3. The taper 230 glides past the rounded strut chin 270, past the strut ledges 250, 260 and then the rolled edge on lip 50, 60. The strut chin 270 forms and leads to a roll over strut ledges 250, 260. Since the hook 710, 720 of pipe clamp 32 engages the strut ledges 250, 260 the hooks 710, 720, 730, 740, 710', 720', 730', 740' may be designed to correspond with the width edges of the strut 10 forming the channel between the roll over strut ledges 250, 260 as shown in FIG. 2. Hooks 710, 720, 730, 740, 710', 720', 730', 740' may also be sized to bend inwardly during insertion into strut ledges 250, 260 as shown in FIG. 3. The taper 230 has an initial angle αI 234 and height 240 as shown in FIG. 5 to easily allow the taper 230 to be inserted during insertion in between the two strut chins 270 and to permit the tapers 230 to cause hooks 710, 720 to bend or spring toward each other while the pipe clamp 32 is inserted into the strut 10. In the engaged or latched position, the pipe clamp 32 forces the chin 270 into and engage the pipe 40 to retain them together.

Once the hooks 710, 720, 730, 740, 710', 720', 730', 740' slide past the tapers 230 and past the tip of the back angle 232, then the hooks 710, 720, 730, 740, 710', 720', 730', 740' spring outwardly, away from each other so that the strut ledges 250 of the strut lip 50, 60 engages the back angle 232 of the hook 710, 720, 730, 740, 710', 720', 730', 740'. The strut ledges 250, 260 refer to the end of the curl on the strut chin 270 and thus may also be referred to as the rolled over ledge. The back angle 232 has an angle αB 236 such that as the extraction force increases, then the back angle 232 of the hook causes the hooks 710, 720, 730, 740, 710', 720', 730', 740' to dig into strut ledges 250, 260 to increase and further resist springing toward each other and tend to spread away from each other thus further increasing the engagement of the pipe clamp 32 to the strut 10.

The back angle 232 may be flat, curved, bumped, saw toothed, ribbed, wavy or any other suitable shape to engage the strut ledges 250, 260 and the rolled edge on lip 50, 60. For example, the geometry or specific shape of the strut lip 50, 60 may be rounded as shown in the FIGS. 2 and 3, however, the shape of the strut lip 50, 60 may be flat, sharp, square, angled, pointed or any of a variety of shapes possible. These shapes may be applied to accommodate the wide variation of tolerances of the strut lip 50, 60 as a result of the manufacturing and construction of strut 10 and even due to the way the strut 10 is formed or cut. In other words, although the strut 10 may be constructed by a wide variety of strut manufacturers, the general dimensions of the strut 10 may be generally similar however there may be variations on the thickness and edges of the strut 10. Thus, since there may be a wide amount of variation in the shape of the end of the strut edges, according to one embodiment, the hook has a height H 240 as shown in FIG. 5 such that the back angle 232 can be selected or designed to engage any suitable portion of the strut ledges 250, 260, lip 50, 60 and any suitable shape of lip or lip end. For example, the length of the back angle 232, the angle αB 236 and the height H 240 of the hook 710, 720, 730, 740, 710', 720', 730', 740' may correspond with the thickness of the sheet metal forming the lip 50, 60. Thus, the height H 240 might be greater, smaller or substantially the same as the thickness of the sheet metal forming the lip 50, 60. For example, selecting the height H 240 to create overhang on the lip 50, 60 may increase retention. Conversely, the less height H 240, the less overhang will result on the back angle 232, the less retention will result.

According to one embodiment, the pipe clamp 32 has a retention force of about 1250 pounds; however the retention force may be more than 1250 pounds, say for large pipe or heavy applications or less than 1250 pounds for smaller pipe or lighter applications. For example, if the application only requires 200 pounds of retention then the Height H 240 and overhang can be less, and other dimensions can be suitably selected.

The parent application Ser. No. 16/597,060 referenced above herby incorporated by reference describes a suitable pipe clamp 32 that also clips into a strut receiver 620 that can clip into a strut 10 and also into slots 52 of strut 10 as shown in FIGS. 1-6 of the parent application. FIGS. 15-17 of the parent application illustrate the strut receiver 620 and a strut 10 as referenced in the parent application. According to one embodiment, the pipe clamp 32 attaches to the strut receiver 620. Strut receiver 620 includes a bottom portion 630 having a plurality of slots 510, a first side 640 connected to the bottom portion 630 and a second side 650 connected to the bottom portion 630, thereby forming a U-shaped structure with the first 640 and second sides 650. The sides 640, 650 have optional corresponding plurality of first engagement springs that each have an outward facing wings. FIG. 16 of the parent application illustrates a strut receiver 620 according to another embodiment. As shown in FIG. 17 of the parent application the wings include sheer tabs 690 to snap into a rim 50, 60 and wherein the wings 680 engage rim 50, 60 edges when in an engage position. The rim 50, 60 has a curled lip at an end opposite the bottom portion 630.

Figure 4:
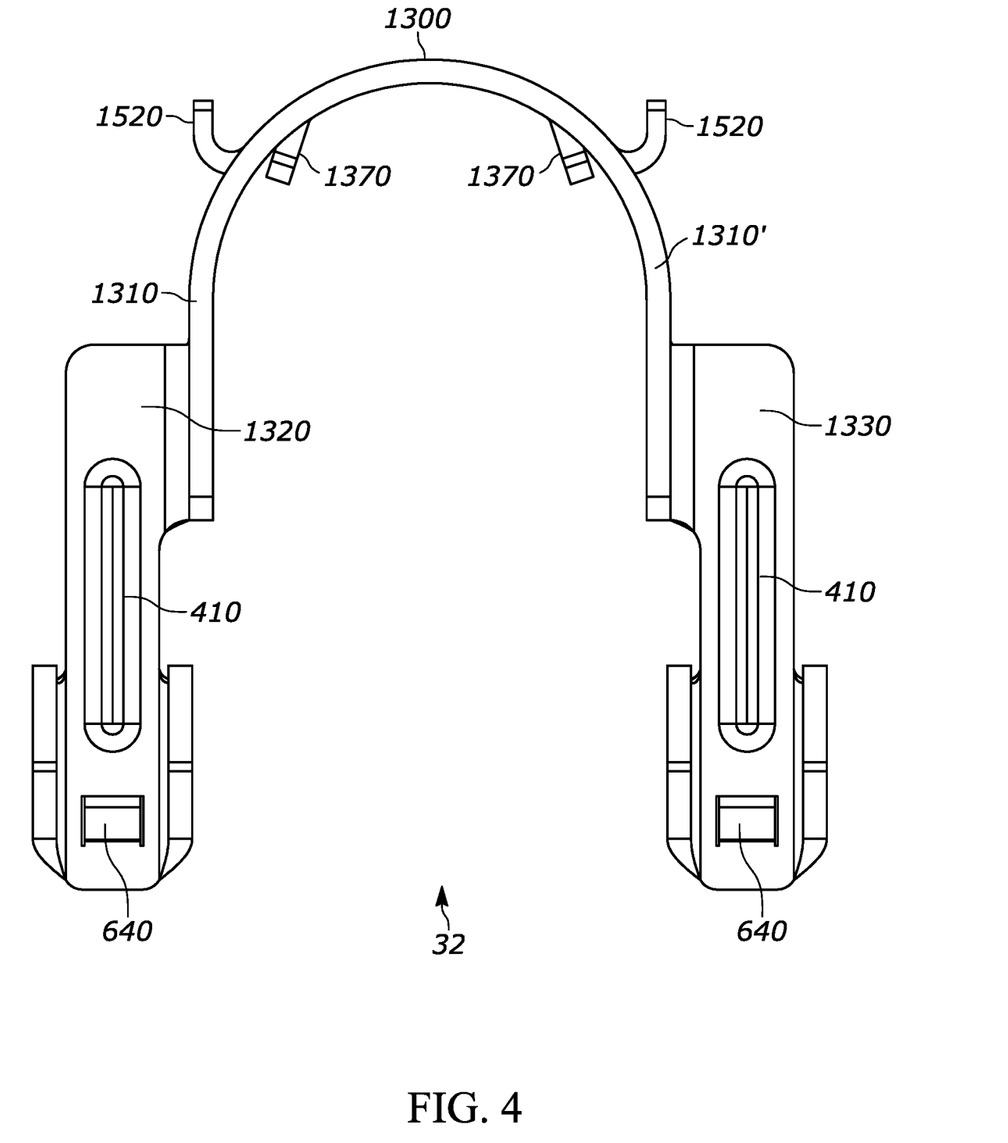
FIG. 4 is a side view of a pipe clamp according to an embodiment.

Referring to FIGS. 4, 6, 7, a removal tool such as a screwdriver may be used to pry in between wing 1320, 1330 and lips 50, 60 until hitting stop or removal tab 690 to prevent going too far while pushing in. As shown in FIG. 3, taper 230 then disengages from strut ledges 250, 260 and thus pulling results removing taper 230 from ledges 250, 260 and springs away wings 1320, 1320', 1330, 1330' away from lips 50, 60 or towards each other to facilitate removal of the pipe clamp 32. In other words, when the removal tool is inserted, tab 690 acts to stop the insertion of the removal tool and to indicate to the operator to wedge the removal tool and then pull up on tab 690 to pry the wing 1320, 1320', 1330, 1330' away from strut lip 50, 60. The springing force opposing pulling out or withdrawal is due to the springing action of barbs 1370 described in more detail below. As shown in FIG. 6, the tip of the removal tool may be inserted inside the channel formed between the hooks 710 and 710', 720 and 720', 730 and 730'; 740 and 740'. According to one embodiment, only one removal tool is needed and thus only one wing 1320, 1320', 1330, 1330' needs to be disengaged from the corresponding strut lip 50, 60, by rotating and pivoting on the opposite wing 1320, 1320', 1330, 1330' and then simply lift away from the opposite wing to disengage from the corresponding strut lip 50, 60.

FIGS. 2-7 further illustrate the pipe clamp 32 in different perspectives and in different stages of engagement. FIG. 4 shows a side view of pipe clamp 32 having a bottom portion 1300 a first side 1310 and a second side 1310'. Each side has wings 1320, 1320', 1330, 1330' for engaging strut lips 50, 60. According to one embodiment, only one wing 1320, 1330 per side engages strut lips 50, 60. The wings 1320, 1320', 1330, 1330' form a u-shape pipe clamp 32. Hooks 710, 710', 720, 720', 730, 730', 740, 740' extend from the wings 1320, 1320', 1330, 1330'. The bottom portion 1300 has a shape selected from at least one of: a semicircular, oval, or conic, straight, V-shaped, bent, I-shaped, or any suitable shape.

As shown in FIGS. 4 and 7, gusset 410 is a depression formed on wings 1320, 1320', 1330, 1330' to add rigidity and strength. Gusset 410 may be a stamping on wings 1320, 1320', 1330, 1330' along a suitable length of wings 1320, 1320', 1330, 1330'. The Gusset 410 supports and strengthens the wings 1320, 1320', 1330, 1330' to prevent bending and failure of the wings 1320, 1320', 1330, 1330' during insertion and extraction. Depending on the geometry of the wings 1320, 1320', 1330, 1330', if the length and thickness of the metal requires stiffness, a higher spring constant or additional strengthening, then the depth, shape, width and length, or any suitable characteristic of the gusset 410 may be sized in order obtain the desired characteristics.

The pipe clamp bottom portion 1300 further comprises a plurality of tensioner prongs or "barbs" 1370 to engage a conduit or pipe 40 when the pipe clamp 32 is in an engaged position with the receiver 20. Barbs 1370 will touch a surface of the conduit 40 during engagement such that the barbs 1370 will flex, and maintain pressure to prevent conduit 40 from sliding back and forth. In other words, during installation, the installer may overdrive insertion tabs 1520 on pipe clamp 32 compressing barbs 1370 allowing back angle 232 to clear ledge 250 on strut lip 50. The barbs 1370 then spring the back angle 232 and then rebound into an engaged position as described above. Engagement may be performed by a hammer and screw driver striking the insertion taps 1520 to produce sufficient force to overdrive as explained above.

According to one embodiment as shown in FIGS. 2 and 3, each wing 1320, 1320', 1330, 1330' on the pipe clamp 32 has an optional shoulder stop 310. Shoulder stop 310 is positioned such that shoulder stop 310 bottoms out with chin 270 to provide the desired limited and precise amount of overdrive. Shoulder stop 310 creates a hard stop during insertion to prevent over insertion. A gap as seen in FIGS. 2 and 3 between chin 270 and shoulder 310 and may be any suitable design choice by material or the lack of material. Removal is performed by pushing into insertion tabs 1520 on pipe clamp 32 compressing barbs 1370 allowing back angle 232 to clear ledge 250 on strut lip 50 while prying the removal tool as described above. Wall shoulder 310 is thus flat or vertical to make shoulder 310 strong or any suitable shape such as curved, angled or rounded.

Also barbs 1370 take up tolerance and thus may accommodate a suitable tolerance between the pipe clamp 32 and the conduit 40, so there may be a suitable resulting gap between conduit 40 and the pipe clamp 32. Thus a design choice for a range of different diameter conduit 40 could fit within any single pipe clamp 32. Thus, it is not necessary to have a different size pipe clamp 32 for different size of conduit 40. For example, a pipe clamp 32 can have the barbs 1370 sized and other suitable dimensions to accommodate 2, 3 or even more different diameters of conduit 40. Different shapes of pipe 40, such as square, oval, triangular or any suitable shape of pipe 40 are contemplated. As the pipe clamp 32 is inserted during engagement, pipe 40 is pushed and depending on the relative diameter will cause square pipe clamp 32 to bend according to the conduit outer surface, for example into a rounded shape and in combination bends with the springing action of barbs 1370, takes a set. For example, bending may occur beyond the yield point according to the modulus of elasticity of the material such as metal or plastic in pipe clamp 32 and changes the shape and the spring rate. The mentioned factors may be selected or designed so the pipe 40 or different diameters of pipe 40 does not become loose. According to one embodiment, the prongs 1370 accommodate different pipe sizes such as pipe 40. For example, the curved and/or sharp point 1370 digs into pipe 40 body and may be sized accordingly as described.

As described, the pipe clamp 32 may further include at least one insertion driver prong, tab 1520 on the bottom portion 1300 to assist in snapping the at least one wing 1320, 1320', 1330, 1330' into the slot 52, 510. Insertion may be by a palm push on bottom portion 1200. Alternatively a screw driver pushed down on insertion tab 1520 creates a force along the wing 1320, 1320', 1330, 1330' so screw driver pushes in, on each side one at a time, to cause wing 1320, 1320', 1330, 1330' to snap and engage. Pushing with one's palm may cause wings 1320, 1320', 1330, 1330' depending on the direction of force, may go off center. Pushing with screw driver directs force in the direction of the strut 10, with an ergonomic handle.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A U-shaped clamp to attach a pipe to a structural member comprising:
   a bottom portion conforming to the curvature of the pipe,
   a first side having a first pair of wings bent from the bottom portion to form a half U;
   a second side having a second pair of wings bent from the bottom portion to form a half U thereby forming a U-shaped structure with the first and second sides; and
   a pair of hooks at the end of each wing opposite the bottom portion, the pair of hooks of a first wing in each pair of wings opposing the pair of hooks of the other wing in each pair of wings, wherein the opposing hooks on each side snaps into corresponding strut ledges on opposite sides of the structural member when in an engaged position;
   wherein each hook is cut from the wing and is bent at an angle to the wing such that an end of each hook engages the strut ledge.

2. A U-shaped clamp as in claim 1, wherein each hook includes a taper wherein upon insertion each taper engages the strut ledge of the structural member, causing the wings to spring inwardly when in the engaged position.

3. A U-shaped clamp as in claim 2, wherein each hook includes a back angle at an end of the hook opposite the taper wherein each back angle upon insertion engages a lip at an end of a rolled edge of the structural member.

4. A U-shaped clamp as in claim 3, wherein the back angle can be flat, curved, wavy, saw toothed, oval or angled.

5. A U-shaped clamp as in claim 3, wherein each wing of the first and second pairs of wings snap away from each other when the back angle slides past the lip to engage the back angle and engage the U-shaped clamp into the structural member.

6. A U-shaped clamp as in claim 3, wherein the back angles on the hooks accommodate different shapes and sizes of strut ledges, and strut widths.

7. A U-shaped clamp as in claim 3, further including a removal tab on each wing such that a removal tool engages the removal tab to disengage the back angle from the strut ledge of the structural member to release the wings from the rolled edge.

8. A U-shaped clamp as in claim 1, wherein the bottom portion has a shape selected from at least one of: a semicircular, oval, square, rectangular, angled, or conic.

9. A U-shaped clamp as in claim 1, further including barbs on the bottom portion to spring during insertion and spring back when engaged.

10. A U-shaped clamp as in claim 9, wherein the barbs adjust to different diameter and shaped pipes.

11. A U-shaped clamp as in claim 1, further including a driver prong on the bottom portion to assist in snapping the first and second pairs of wings into the slot.

12. A U-shaped clamp as in claim 1, further including a gusset on at least one wing.

13. A U-shaped clamp as in claim 1, wherein the structural member is a strut, comprising:
    a bottom portion;

a first side connected to the bottom portion;
a second side connected to the bottom portion forming a U-shaped structure with the first and second sides;
wherein the first and second sides each have corresponding strut ledges at an end opposite the bottom portion.

14. A structural member assembly comprising:
a strut having a strut ledge at each end of the strut;
  a first side connected to a bottom portion;
  a second side connected to the bottom portion, thereby forming a U-shaped structure with the first and second sides;
a pipe clamp comprising:
  a pipe clamp bottom portion,
  a first side having a first pair of wings bent from the pipe clamp bottom portion to form a half U;
  a second side having a second pair of wings bent from the pipe clamp bottom portion to form a half U; and
a pair of hooks at the end of each wing opposite the bottom portion, the pair of hooks of a first wing in each pair of wings opposing the pair of hooks on the other wing in each pair of wings, wherein the opposing hooks on each side snaps into corresponding strut ledges on opposite sides of the strut;
wherein the hooks are oriented parallel to the bottom portion, wherein each hook is cut from the wing and is bent at an angle to the wing such that an end of each hook engages the strut ledge.

15. A structural member assembly of claim 14 wherein each hook includes a taper wherein upon insertion each taper engages the strut ledge of the strut, causing the wings to spring inwardly when in the engaged position.

16. A structural member assembly as in claim 15, wherein each hook includes a back angle at an end of the hook opposite the taper wherein each back angle upon insertion engages a lip at an end of a rolled edge of the strut.

17. A structural member assembly as in claim 16, wherein the back angle can be flat, curved, wavy, saw toothed, oval or angled.

18. A structural member assembly as in claim 16, wherein the wings snap away from each other when the back angle slides past the lip to engage the back angle and engage the U-shaped clamp into the strut.

19. A structural member assembly as in claim 14, wherein each hook has a height to engage the strut ledge.

20. A structural member assembly as in claim 14, wherein the pipe clamp is a single piece U-Shaped clamp.

\* \* \* \* \*